June 16, 1936.　　J. L. CREVELING　　2,044,469
LUBRICATING DEVICE
Filed July 22, 1932
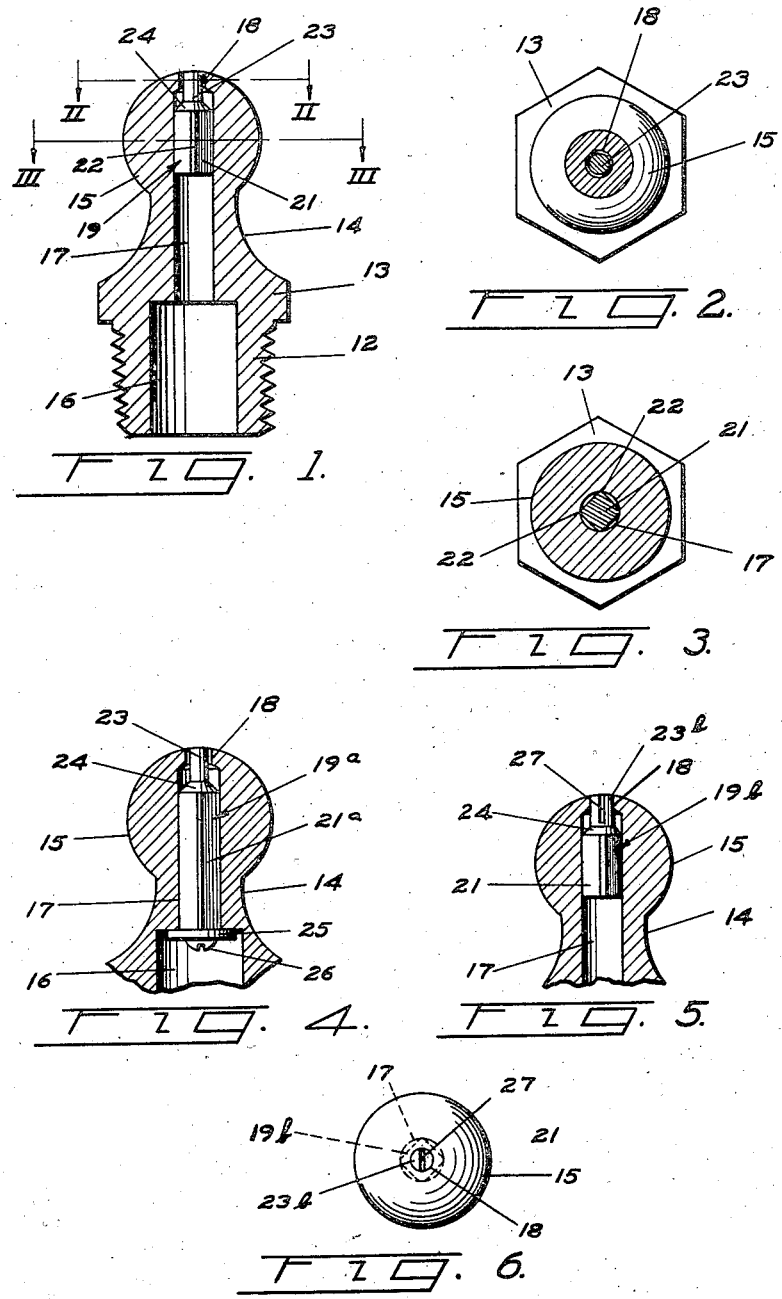
INVENTOR.
JOHN L. CREVELING
BY
ATTORNEY.

Patented June 16, 1936

2,044,469

UNITED STATES PATENT OFFICE 2,044,469

LUBRICATING DEVICE

John L. Creveling, near Tucson, Ariz., assignor to The Lubrication Corporation, South Bend, Ind., a corporation of Delaware Application July 22, 1932, Serial No. 623,938

11 Claims. (Cl. 184—105)

This invention relates to lubrication devices and more particularly to lubrication fittings or nipples.

One of the objects of this invention is to provide a lubrication fitting of inexpensive design and construction.

A further object is to provide a lubrication fitting in which an inlet opening of minimum useful width and of maximum length prevents outward leakage of lubricant and ingress of dirt but which will not prevent ingress of lubricant if the lubricant be supplied under relatively high pressure.

A further object is to provide a lubrication fitting having a minimum width inlet opening and a novel type of valve of inexpensive design.

Further objects of the invention will be apparent after reading the specification and claims and after considering the accompanying drawing.

Lubrication fittings of various kinds have been designed and constructed. For instance, the lubrication fittings disclosed herein are in some respects similar to fittings disclosed in Morris Reissue Patent #18,123 but in other respects are different therefrom.

Valved fittings are preferable for many purposes but are more expensive to construct than fittings of the valveless type although fittings of the latter type are quite satisfactory under many circumstances. In a fitting of the valveless type, the inlet opening must be relatively small to prevent the escape of lubricant and to prevent the ingress of dirt yet the opening must be large enough so that it is possible to force lubricant into the fitting fairly rapidly by means of a reasonable pressure.

In illustration of my invention, I have shown several types of fittings in each of which a body formed with a longitudinal bore is provided with a slug adapted to restrict the size of a portion of the bore in the head of the fitting. The slugs as shown have guide portions which are flat sided with beveled or rounded corners so that the guide portions are firmly secured within their respective bores. In one preferred form of fitting disclosed, a portion of the slug is cylindrical and together with the inlet bore forms an annular slit through which lubricant is forced into the fitting. In another embodiment of my invention the slug is provided with a yielding washer secured thereto which thus forms a check valve.

In order to explain the invention more clearly, I have shown several embodiments thereof in the accompanying drawing, in which:

Fig. 1 is a view in section of a fitting constructed according to my invention;

Fig. 2 is a view in section taken substantially on the line II—II of Fig. 1;

Fig. 3 is a view in section taken substantially on the line III—III of Fig. 1;

Fig. 4 is a fragmentary view in section of a modified form;

Fig. 5 is a fragmentary view in section of a still different modified form; and

Fig. 6 is a plan view of the fitting shown in Fig. 5.

Referring in detail to the drawing, I have shown in Fig. 1 a fitting having a threaded shank portion 12, an enlarged shoulder 13, a reduced neck portion 14 and a ball shaped head 15. Extending longitudinally through the body are a plurality of bores of different diameters, bore 16 being of relatively large diameter, bore 17 being of intermediate diameter, and bore 18 being of relatively small diameter.

Positioned within the bores 17 and 18 is a slug generally designated 19 formed with a guide portion 21 of generally square cross section as is shown most clearly in Fig. 3. Though the portion 21 is substantially square, it has the corners beveled or rounded off as at 22. Outwardly from the guide portion 21, the slug 19 is formed with a cylindrical portion 23 of reduced cross section, joined to the guide portion 21 by means of a beveled shoulder 24.

The diameter of the cylindrical portion 23 approximates that of the bore 18, but is slightly smaller than said bore so that there is formed around the cylindrical portion 23 a circular slit of very little width and of maximum length for the size of the bore 18. This slit is of much less width than the diameter of a single hole capable of passing the lubricant required.

The slug 19 is formed so that the guide portion 22 has a drive fit in the bore 17, and the cylindrical portion 23 is formed with a diameter producing the width of slit desired, and for some uses I find a slit of .002" or .003" satisfactory.

It is believed that the operation of supplying this fitting with lubricant will be clear from the above description. Lubricant can be forced in through the annular opening formed between the sides of the bore 18 and the cylindrical portion 23 of the slug 19. The lubricant then passes the flat sides of the guide portion 21 into the bore 17 and then through the bore 16 into the bearing which is to be lubricated. Because of the small width of the slit, neither dirt nor dust enter the fitting and lubricant will not, under ordinary pressure, ooze out.

In Fig. 4 the slug 19a has an extra long guide portion 21a extending inwardly to the inner end of the bore 17 and has a washer 25 of flexible material such as leather or thin sheet metal secured to its inner end by any suitable means such as for example a screw 26.

This form of my invention operates in a manner similar to that disclosed above in connection with the form shown in Fig. 1 with the additional feature that the washer 25 serves as a check valve to prevent lubricant from passing outwardly through the bore 17.

In Figs. 5 and 6 the slug 19b is formed with a cylindrical portion 23b having a diameter equalling the diameter 18, the cylindrical portion being formed with a transverse slit 27 extending inwardly thereof to a point within the bore 17.

This form of fitting operates quite similarly to the forms described above. Lubricant is forced in through the slit 27 and then passes around the sides of the guide portion 21 into the bores 17 and 16 and into the bearing to be lubricated.

It may be seen that I have provided a lubrication fitting which is inexpensive and yet is capable of operating satisfactorily under ordinary circumstances. The fitting described is provided with a constant inlet opening of minimum width and maximum length. In the preferred form there is shown a lubrication fitting having no moving parts. By means of this fitting bearings may be efficiently lubricated and yet dirt and other foreign substances will be excluded.

It is to be understood that the above described embodiments of my invention are for the purpose of illustration only and various changes may be made therein without departing from the spirit and scope of the invention.

I claim:

1. In a lubricant receiving fitting, a body formed with a bore therethrough, an elongated stationary slug fixed in said bore and extending to the inlet end of the bore and flush with the outer surface of the adjacent portion of the body, thereby to partially close the entrance of the bore, the relative sizes of said bore and said slug being such as to provide a lubricant passage space of minimum width for the passage of chassis lubricants therethrough under ordinary lubricant servicing operating pressures.

2. In a lubrication fitting, a body fashioned for detachable connection with a lubricant discharge nozzle, said body being formed with a circular bore, an elongated flat sided slug positioned in said bore and fixed therein against movement during the normal servicing of the fitting, and a cylindrical extension on the slug extending into the inlet end of the bore and cooperating therewith to provide a lubricant conducting space in the fitting bore which is of minimum area for the passage of chassis lubricants therethrough under ordinary lubricant servicing operating pressures.

3. A lubricant receiving fitting comprising a body member having an exterior surface portion of uniform contour and further formed with a lubricant conducting passageway therethrough, and means within said passageway and cooperating with said body to provide an inlet for said passageway at said exterior surface portion that is annular in shape.

4. A lubrication fitting comprising, a body fashioned for detachable connection with a lubricant discharge nozzle, said body being formed with a longitudinal lubricant receiving bore, and means for permanently restricting said longitudinal bore at the inlet thereof to an annular opening.

5. A lubrication fitting comprising, a body fashioned for detachable connection with a lubricant discharge nozzle, said body being formed with a longitudinal bore, and a stationary slug positioned in said bore and restricting the mouth of the bore to an annulus.

6. A lubrication fitting comprising, a body formed with a longitudinal bore, and a slug frictionally fixed in said bore having portions contacting at all times with the sides of the bore and concentric with the bore and an extension extending to the mouth of the bore and being flush at its outer end with the outer surface of said fitting body adjacent to the mouth of the bore.

7. A lubrication fitting comprising, a body formed with a circular bore, and a slug positioned in said bore formed with flat sided portions and having corners which contact with the sides of the bore to retain the slug against movement during the normal servicing of the fitting, said slug being further provided with a cylindrical portion spaced from the sides of said bore at the inlet thereof and concentric therewith to restrict the entrance of the bore, the end of said cylindrical portion being flush with the outer surface of said fitting body adjacent to the mouth of the bore.

8. A lubrication fitting comprising, a body formed with a circular bore, and a slug positioned in said bore, said slug being formed with a portion substantially square in cross-section, the corners of which contact with the wall of the bore to retain the slug against movement during the normal servicing of the fitting, said slug being further provided with a cylindrical portion spaced from the sides of said bore at the inlet thereof and concentric therewith to restrict the entrance of the bore, the end of said cylindrical portion being flush with the outer surface of said fitting body adjacent to the mouth of the bore.

9. A lubrication fitting comprising, a body formed with a circular bore, and a slug positioned in said bore, said slug being formed with flat sided portions and having rounded corners which frictionally contact with the sides of the bore to retain the slug against movement during the normal servicing of the fitting, said slug being further provided with a cylindrical portion spaced from the wall of said bore and concentric therewith, the end of said cylindrical portion being flush with the outer surface of said fitting body adjacent to the mouth of the bore.

10. A lubricant receiving fitting comprising, a body formed with a head portion, said fitting having a lubricant conducting passageway extending therethrough with the inlet of the passageway located in said head portion and a member fixed in said passageway and lying wholly within the confines thereof and forming with said passageway an inlet orifice defined by a plain geometric figure such as to provide relatively large cross-sectional area for the passage of relatively large quantities of lubricant therethrough and having relatively narrow width thereby to minimize the entrance of solid foreign substances through the orifice.

11. A lubricant receiving fitting comprising a body formed with a plurality of aligned and interconnecting circular bores having a shoulder formed at the juncture of two of said bores, a slug positioned in said bores and having a non-circular portion frictionally engaged with the walls of one of the bores to retain the slug against movement during the normal servicing of the fitting, said slug being further provided with a portion for restricting the inlet to said plurality of bores to an annular opening, and a flexible washer secured to said slug and contacting with said shoulder to provide a check valve against the return of lubricant feed through said bores.

JOHN L. CREVELING.